United States Patent
Honda et al.

(10) Patent No.: US 12,469,164 B2
(45) Date of Patent: Nov. 11, 2025

(54) VEHICLE EXTERNAL DETECTION DEVICE

(71) Applicant: Honda Motor Co., Ltd., Tokyo (JP)

(72) Inventors: Sora Honda, Tokyo (JP); Shinichi Okunishi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 32 days.

(21) Appl. No.: 18/418,357

(22) Filed: Jan. 22, 2024

(65) Prior Publication Data

US 2024/0354984 A1    Oct. 24, 2024

(30) Foreign Application Priority Data

Apr. 18, 2023    (CN) .......................... 202310414680.0

(51) Int. Cl.
| | |
|---|---|
| *G06T 7/70* | (2017.01) |
| *G01S 13/86* | (2006.01) |
| *G01S 13/931* | (2020.01) |
| *G06V 20/58* | (2022.01) |

(52) U.S. Cl.
CPC .............. *G06T 7/70* (2017.01); *G01S 13/867* (2013.01); *G01S 13/931* (2013.01); *G06V 20/58* (2022.01); *G01S 2013/9323* (2020.01); *G06T 2207/10028* (2013.01); *G06T 2207/30256* (2013.01); *G06T 2207/30261* (2013.01); *G06V 2201/08* (2022.01)

(58) Field of Classification Search
CPC ............. G06T 7/70; G06T 2207/10028; G06T 2207/30256; G06T 2207/30261; G01S 13/867; G01S 13/931; G01S 2013/9323; G01S 2013/9315; G01S 2013/93272; G01S 2013/93274; G01S 7/411; G01S 17/86; G06V 20/58; G06V 2201/08
USPC .............................. 348/148; 342/70; 382/103
See application file for complete search history.

(56) References Cited

U.S. PATENT DOCUMENTS

| | | | | |
|---|---|---|---|---|
| 10,654,475 | B2* | 5/2020 | Takaki ................... | B60W 30/09 |
| 11,428,815 | B2* | 8/2022 | Harrison ................ | G01S 5/14 |
| 11,448,750 | B2* | 9/2022 | Chun ..................... | G01S 13/931 |
| 2009/0040094 | A1* | 2/2009 | Harada .................. | G01S 13/931 |
| | | | | 342/59 |
| 2009/0212993 | A1* | 8/2009 | Tsunekawa .......... | B60R 21/0134 |
| | | | | 342/70 |

(Continued)

FOREIGN PATENT DOCUMENTS

JP    2016173795    9/2016

*Primary Examiner* — Christopher S Kelley
*Assistant Examiner* — Asmamaw G Tarko
(74) *Attorney, Agent, or Firm* — JCIPRNET

(57) ABSTRACT

A vehicle external detection device is provided. An imaging device and a radar device are mounted in a vehicle and configured to detect a rear lateral side of the vehicle. Detection regions of the imaging device and the radar device are overlapped with each other. The vehicle external detection device includes an imaging occlusion occurrence detection device and a correction device. The imaging occlusion occurrence detection device is configured to detect, from image information detected by the imaging device, an object and an occurrence of an occlusion where the object shields a distant viewing angle. The correction device is configured to correct position information of the object detected by the radar device when the imaging occlusion occurrence detection device detects the occurrence of the occlusion.

3 Claims, 11 Drawing Sheets

(56) References Cited

U.S. PATENT DOCUMENTS

| | | | |
|---|---|---|---|
| 2011/0044507 A1* | 2/2011 | Strauss | B60W 40/04 |
| | | | 382/103 |
| 2013/0335569 A1* | 12/2013 | Einecke | G01S 13/867 |
| | | | 348/148 |
| 2016/0291145 A1* | 10/2016 | Zeng | G01S 7/415 |
| 2016/0291149 A1* | 10/2016 | Zeng | G01S 13/874 |
| 2018/0099665 A1* | 4/2018 | You | G01S 13/931 |
| 2018/0178786 A1* | 6/2018 | Takaki | G08G 1/166 |
| 2020/0174113 A1* | 6/2020 | Lee | B60R 11/04 |
| 2020/0339128 A1* | 10/2020 | Kanoh | B62D 6/00 |
| 2021/0089843 A1* | 3/2021 | Mizoguchi | G06V 10/22 |
| 2022/0206110 A1* | 6/2022 | Goda | G01S 15/931 |
| 2024/0142597 A1* | 5/2024 | So | G01S 13/46 |
| 2024/0288574 A1* | 8/2024 | Ishikawa | G01S 7/41 |

* cited by examiner

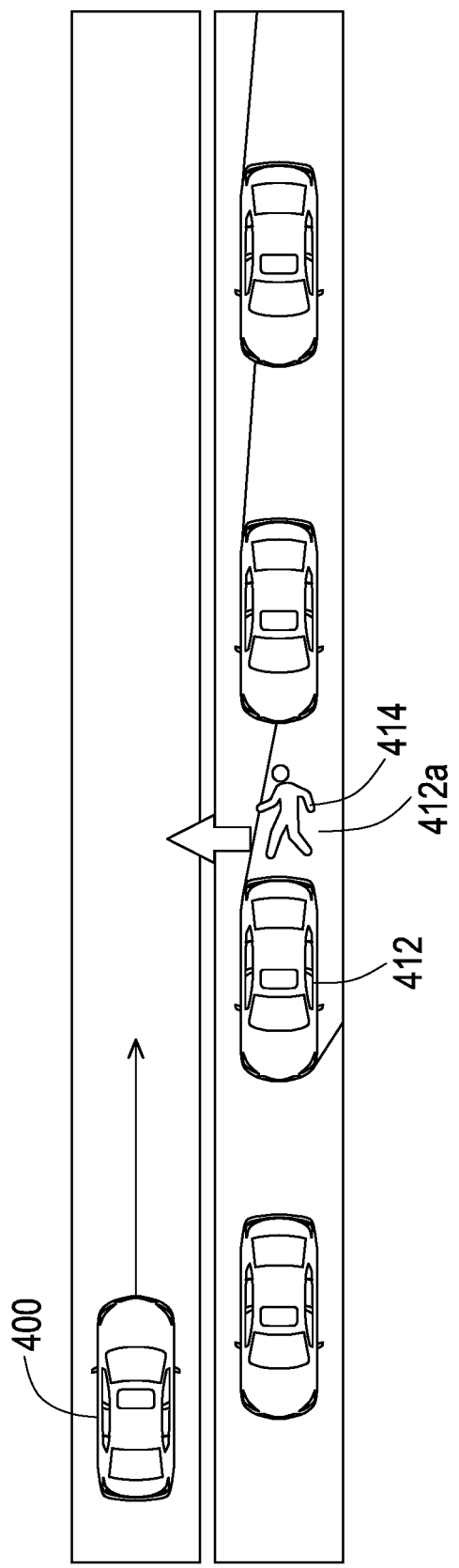

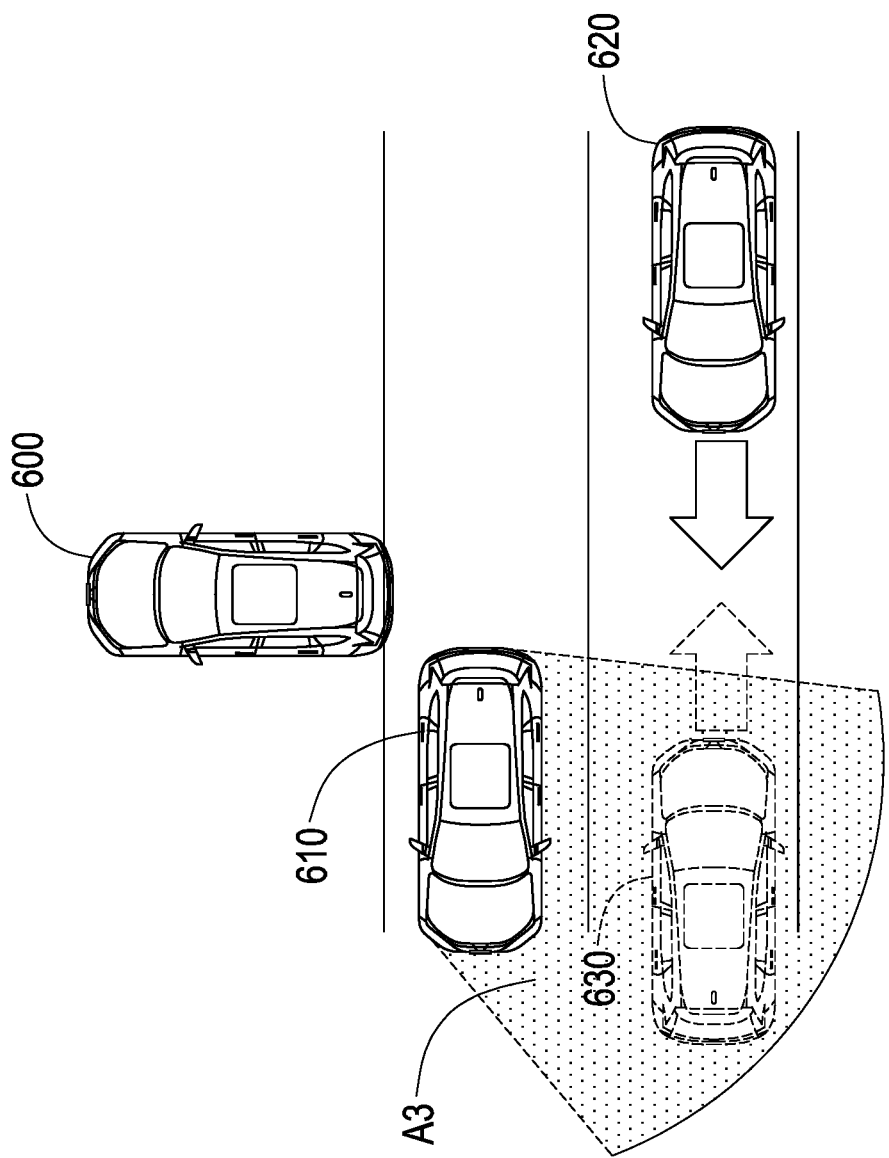

VEHICLE EXTERNAL DETECTION DEVICE

CROSS-REFERENCE TO RELATED APPLICATION

This application claims the priority benefit of China application no. 202310414680.0, filed on Apr. 18, 2023. The entirety of the above-mentioned patent application is hereby incorporated by reference herein and made a part of this specification.

BACKGROUND

Technical Field

The disclosure relates to a detection device, and particularly relates to a vehicle external detection device.

Description of Related Art

In recent years, efforts to fight for the accessibility of a sustainable transportation system that takes into consideration the position of inferior participants in transportation have become active. To achieve this goal, research and development are underway to further improve traffic safety or convenience through the development of driving assistance technology.

Conventionally, assuming that a vehicle is traveling on a driving lane, multiple paths serve as a countermeasure against a multi-path excessive detection target within the vehicle's own lane. Due to vehicles and occlusions from the lateral side, the multi-path excessive detection target is unable to function properly.

Patent Document 1 discloses an image processing device configured to keep track of an occlusion position. The image processing device of Patent Document 1 extracts a feature point of a target from a first frame of a video shot by an imaging device, and looks for a track point that coincides with the feature point in a second frame, while predicting the position of the feature point in the first frame, thereby determining the presence of an occlusion based on the difference between the position of the feature point that is found and the position of the tracking point that is predicted. However, due to vehicles and occlusions from the lateral side, the multi-path excessive detection target is unable to function normally in the image processing device.

PRIOR ART DOCUMENT(S)

Patent Document(s)

[Patent Document 1] Japanese Laid-open No. 2016-173795

Regarding the driving stability of vehicles, how to handle vehicles approaching from the lateral side to prevent an excessive detection target from occurring due to the multiple paths of an obstacle has been an issue for researchers of this field.

The disclosure provides a vehicle external detection device capable of removing an excessive detection target by detecting the occurrence of an occlusion. This further helps the development of a sustainable transportation system.

SUMMARY

An aspect of the disclosure provides a vehicle external detection device. An imaging device and a radar device are mounted in a vehicle and configured to detect a rear lateral side of the vehicle. Detection regions of the imaging device and the radar device are overlapped with each other. The vehicle external detection device includes an imaging occlusion occurrence detection device and a correction device. The imaging occlusion occurrence detection device is configured to detect, from image information detected by the imaging device, an object and an occurrence of an occlusion where the object shields a distant viewing angle. The correction device corrects position information of an object detected by the radar device when the occurrence of the occlusion is detected.

In order to make the above-mentioned features and advantages of the disclosure more obvious and easy to understand, the following is a detailed description of the embodiments with reference to the accompanying drawings.

BRIEF DESCRIPTION OF THE DRAWINGS

FIGS. 4A and 4B are schematic views illustrating a street occlusion scene according to an embodiment of the disclosure.

FIGS. 6A to 6D are schematic views illustrating that a determination on implementing in an excessive detection process according to an embodiment of the disclosure.

DESCRIPTION OF THE EMBODIMENTS

Figure 1:
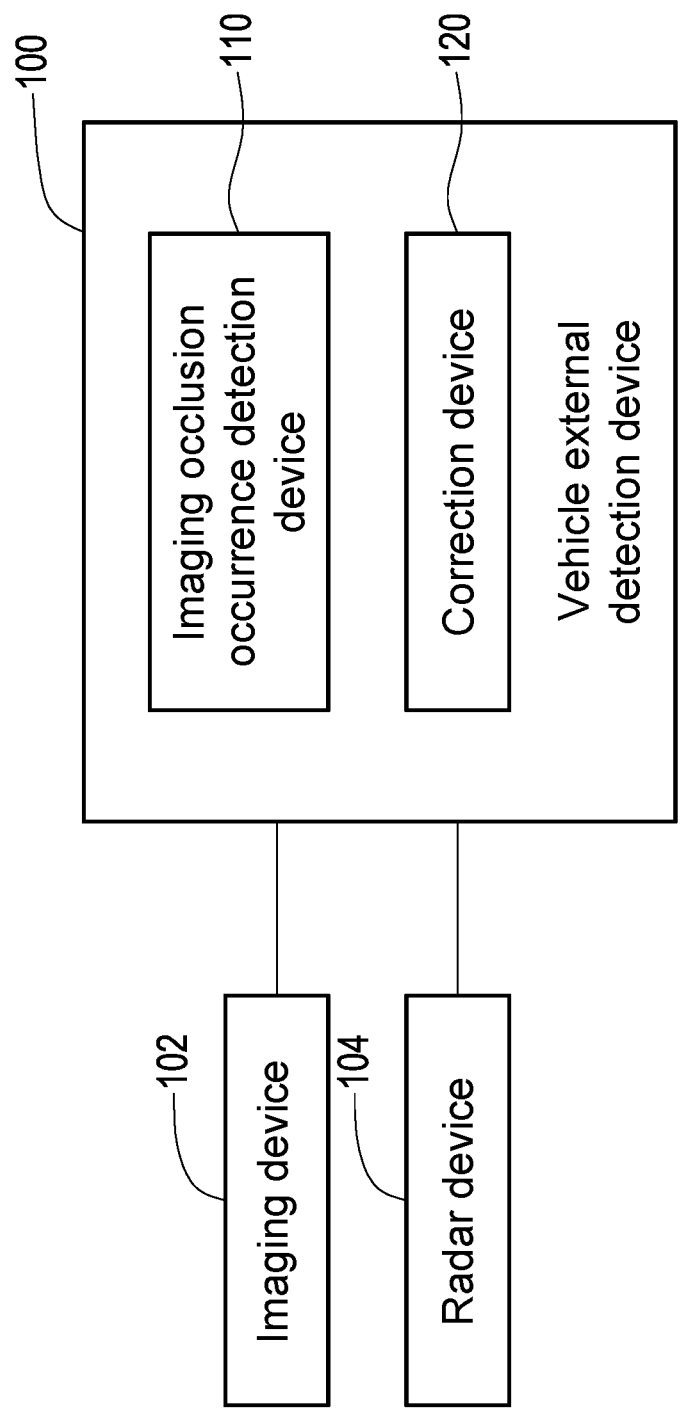
FIG. 1 is a schematic block diagram illustrating a vehicle external detection device according to an embodiment of the disclosure.

An aspect of the disclosure provides a vehicle external detection device. An imaging device and a radar device are mounted in a vehicle and configured to detect a rear lateral side of the vehicle. Detection regions of the imaging device and the radar device are overlapped with each other. The vehicle external detection device includes an imaging occlusion occurrence detection device and a correction device. The imaging occlusion occurrence detection device is configured to detect, from image information detected by the imaging device, an object and an occurrence of an occlusion where the object shields a distant viewing angle. The correction device corrects position information of an object detected by the radar device when the occurrence of the occlusion is detected.

According to an embodiment of the disclosure, when the occurrence of the occlusion and that an object larger than the object where the occlusion occurs is present at a position further away from a position the object where the occlusion occurs are detected, the correction device does not remove excessive detection of the radar device.

According to an embodiment of the disclosure, when the occurrence of the occlusion is detected, for a laser detection object different from the object where the occlusion occurs, the correction device determines position information of the laser detection object based on driving lane information and object movement velocity obtained from map information.

Based on the above, in the vehicle external detection device according to the embodiments of the disclosure, the imaging target occlusion is detected by analyzing the image information detected by the imaging device. In addition, when the occurrence of the imaging target occlusion is detected, the radar target is corrected. The vehicle external detection device according to the embodiments of the disclosure further includes determining whether to correct the radar target by using the imaging target according to whether the imaging target is present in the occlusion region of the imaging target, or performing the radar excessive detection process according to the map information and the movement velocity of the radar target. Accordingly, the excessive detection target due to multiple paths that pass through the obstacle can be avoided.

In the following, the exemplary embodiments of the disclosure will be described in detail. The examples of the exemplary embodiments are illustrated with reference to the accompany drawings. Where possible, the same reference symbols are used to indicate the same or similar portions in the accompanying drawings and description.

The embodiments of the disclosure focus on the case where excessive detection occurs due to multiple paths of a radar when another vehicle or a shielding object is parked/placed on the side of the road during a vehicle traveling process. Excessive detection is avoided by analyzing the image information of an imaging device to detect the occlusion of an imaging target when shielded by an obstacle, and correcting a radar target detected by the radar device according to the result of detection.

FIG. 1 is a schematic block diagram illustrating a vehicle external detection device according to an embodiment of the disclosure. Referring to FIG. 1, a vehicle external detection device 100 of the embodiment is disposed in an own vehicle, for example. In the embodiment, the own vehicle is a vehicle using an internal combustion engine, such as a diesel engine or a gasoline engine as the power source, an electric vehicle using a motor as the power source, and a hybrid vehicle having both the internal combustion engine and the motor, etc.

In the own vehicle, an imaging device 102 and a radar device 104 are disposed. The imaging device 102 and the radar device 104 are configured to detect the rear lateral side of the vehicle and have detection regions overlapped with each other. The vehicle external detection device 100 is respectively connected with the imaging device 102 and the radar device 104. The imaging device 102 is, for example, a camera or a video camera that has a light sensor, such as a charge coupled device (CCD). The radar device 104 is, for example, a radar or a light detection and ranging (LiDAR) device. The embodiment does not intend to impose a limitation on the type thereof.

The vehicle external detection device 100 includes an imaging occlusion occurrence detection device 110 and a correction device 120. A portion or the entirety of the device may be realized by executing a program using a processor. In addition, a portion or the entirety of the device may also be realized by using hardware components, such as a large scale integrated (LSI) circuit or an application specific integrated circuit (ASIC), etc., and may also be realized by using a combination of software and hardware. The embodiment does not intend to limit how the device is implemented.

The imaging occlusion occurrence detection device 110 is configured to detect, from image information detected by the imaging device 102, an object and an occurrence of the occlusion where the object shields a distant viewing angle. In addition, since the detection regions of the imaging device 102 and the radar device 104 are overlapped, if an object is detected in the image information detected by the imaging device 102, whether the object shields the distant viewing angle of the imaging device 102 or the radar device 104 may be determined according to the position of the object in the image information.

The correction device 102 is configured to correct the position information of the object detected by the radar device 104 when the imaging occlusion occurrence detection device 110 detects the occurrence of the occlusion. In addition, when the own vehicle moves backward onto a regular road, if there is an occlusion object, such as a stopped vehicle, on the side of the road, target excessive detection may occur due to the multiple paths of the radar. At this time, whether the occlusion resulting from an obstacle is present (i.e., whether there is a region that cannot be sensed by the radar) may be determined through the image information detected by the imaging device 102. In addition, according to the occlusion determination result, whether radar multi-path target excessive detection occurs is determined, and a radar excessive detection removal process is performed accordingly.

Figure 2:
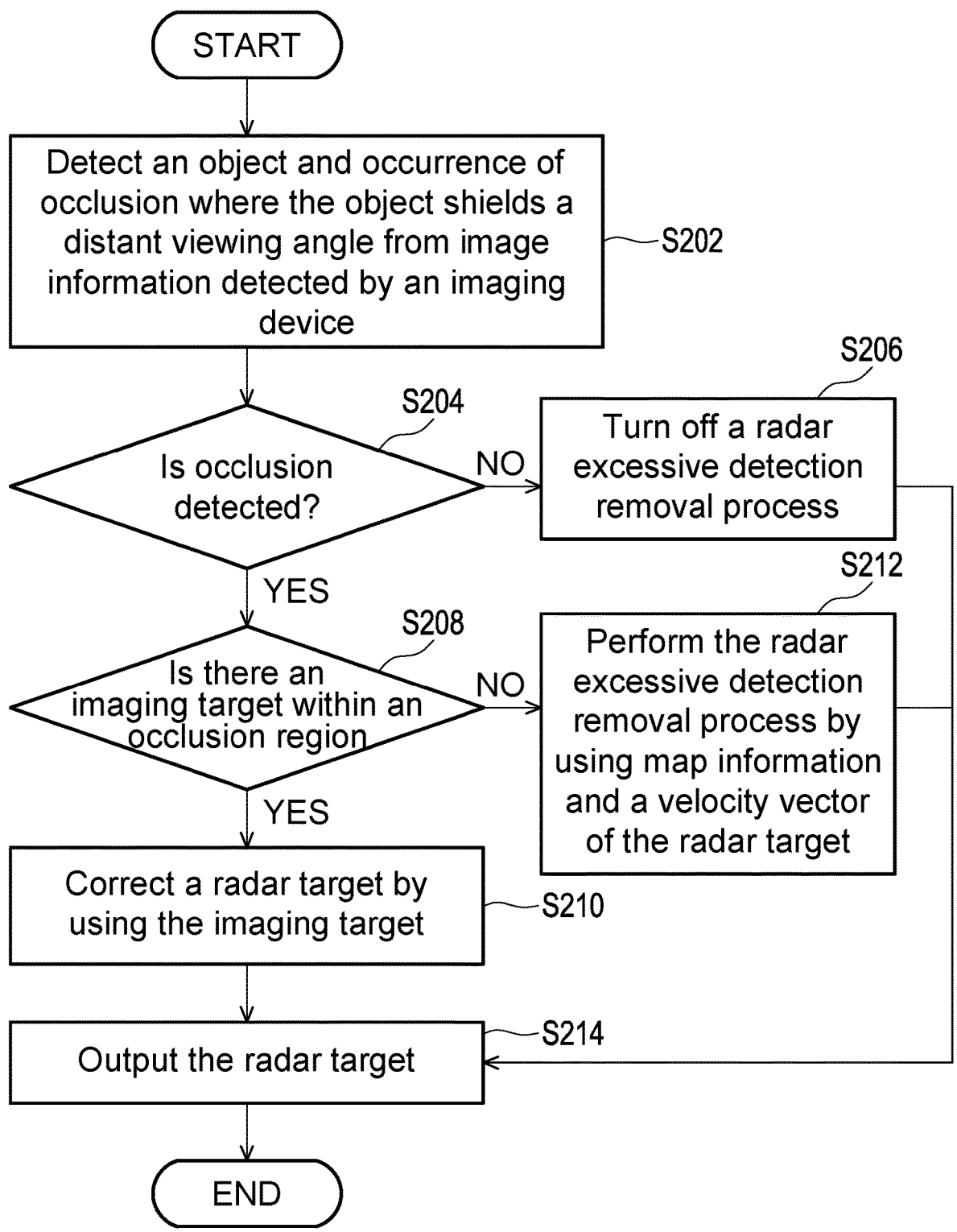
FIG. 2 is a flowchart illustrating a process in which the vehicle external detection device executes a radar excessive detection removal process according to an embodiment of the disclosure.

Specifically, FIG. 2 is a flowchart illustrating a process in which the vehicle external detection device executes the radar excessive detection removal process according to an embodiment of the disclosure. Referring to FIGS. 1 and 2, the method of the embodiment is suitable for the vehicle external detection device 100 of FIG. 1. In the following, the detailed steps of the radar excessive detection removal process of the embodiment are described with reference to the respective components in the vehicle external detection device 100.

In Step S202, the vehicle external detection device 100 detects an object and the occurrence of the occlusion where the object shields the distant viewing angle by using the imaging occlusion occurrence detection device 110 according to the image information detected by the imaging device 102. In addition, in Step 204, the correction device 120 determines whether the imaging occlusion occurrence detection device 110 detects the occurrence of the occlusion.

Figure 3:
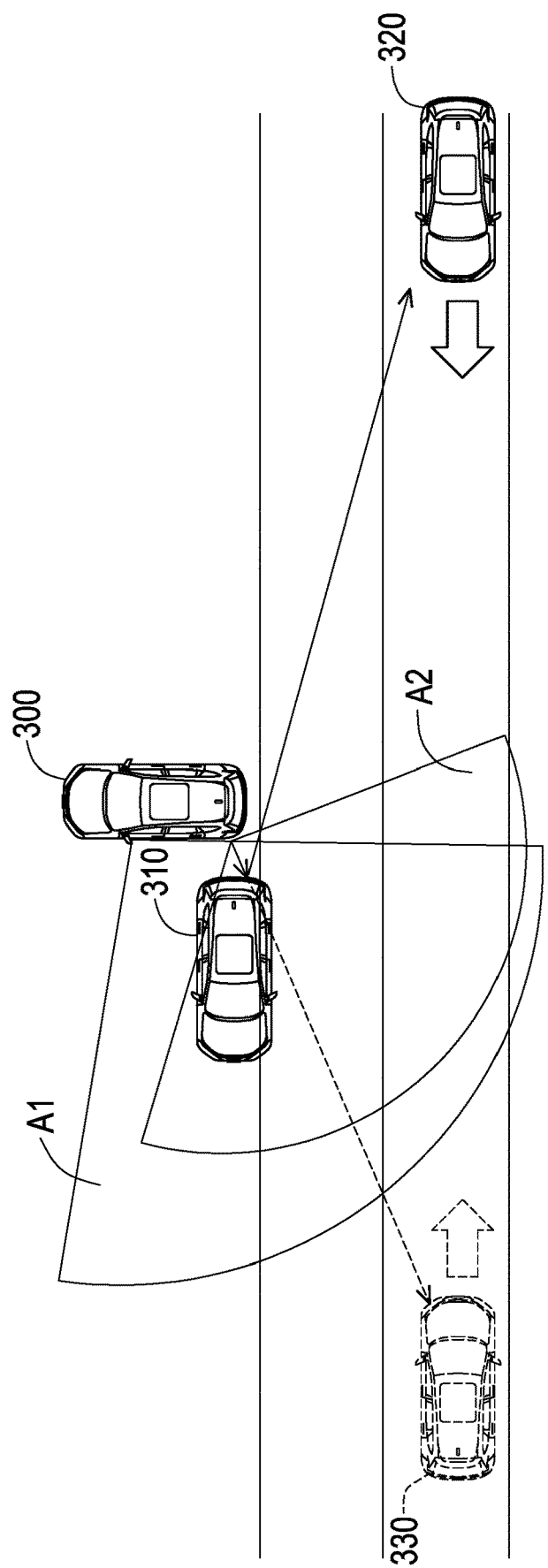
FIG. 3 is a schematic view illustrating radar excessive detection according to an embodiment of the disclosure.

For example, FIG. 3 is a schematic view illustrating radar excessive detection according to an embodiment of the disclosure. Referring to FIG. 3, regarding this, an own vehicle 300 may detect the image information of a detection region A1 on the rear lateral side thereof by using an imaging device disposed on the driving mirror, and detect an object within a detection region A2 on the rear lateral side thereof by using a radar device disposed at the end of the vehicle. In addition, the detection region A1 of the imaging device and the detection region A2 of the radar device are overlapped with each other.

When a stopped vehicle 310 appears on the rear lateral side of the own vehicle 300, the path of the radar waves propagated from the radar device toward the stopped vehicle 310 is altered due to the reflection by the stopped vehicle 310. Accordingly, a real vehicle 320 located in the reflection direction is detected, and the real vehicle 320 is considered as an excessive detection vehicle 330 in the original propagation direction of the radar waves. Such phenomenon is the radar excessive detection resulting from multiple paths.

To correct the radar excessive detection, in the embodiment, whether the target excessive detection occurs in the radar is determined, with the assistance of the image information detected by the imaging device, based on that the detection region A1 of the imaging device and the detection region A2 of the radar device are overlapped. That is, by detecting an imaging occlusion in the image information, whether the target detected by the radar is a multi-path excessive detection target can be determined.

In addition, if the following conditions are satisfied, the radar detection target may be considered as a multi-path excessive detection target and removed:

1. In the case where occlusion information is obtained from the imaging device or other sensors and the target object is thus determined as being located in an occlusion region of the radar device;
2. In the case where the radar target position is present in a region in which the fields of view (FOV) of the radar device and the imaging device for occlusion determination coincide;
3. In the case where the target object is determined as traveling in a reverse lane direction by using map information.

Figure 4A:
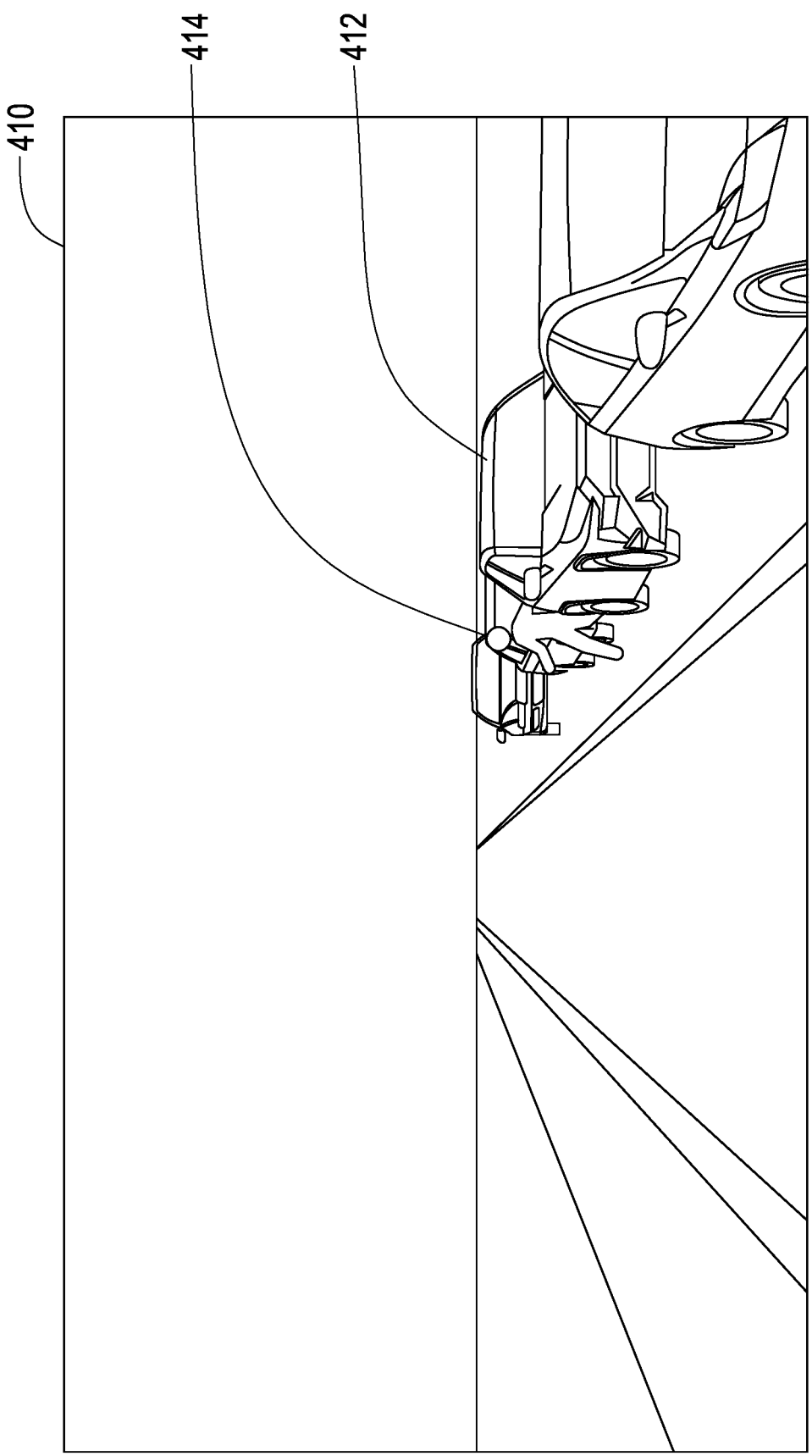

For example, FIGS. 4A and 4B are schematic views illustrating a street occlusion scene according to an embodiment of the disclosure. Referring to FIG. 4A, an image 410 is a street image shot by an imaging device disposed on an own vehicle 400. Since there are many stopped vehicles along the opposite lane, there may be regions in which people and vehicles may hide behind these stopped vehicles. As shown FIG. 4B, a pedestrian 414 intending to walk across the road may hide at a shadow part 412a behind a stopped vehicle 412, and the shadow parts behind the stopped vehicles may be considered as imaging occlusions on the street.

Figure 5A:
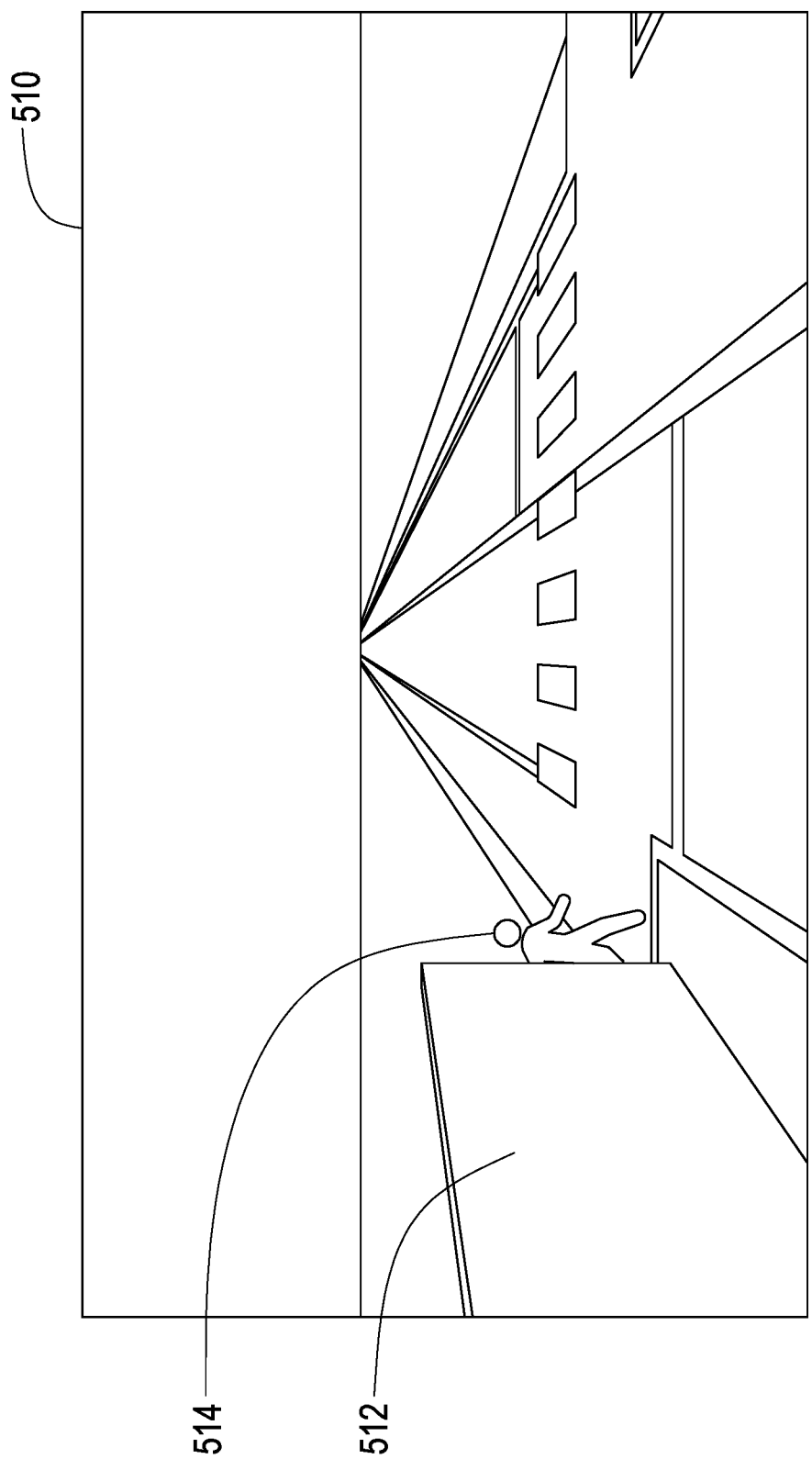
FIGS. 5A and 5B are schematic views illustrating an intersection occlusion scenes according to an embodiment of the disclosure.
Figure 5B:
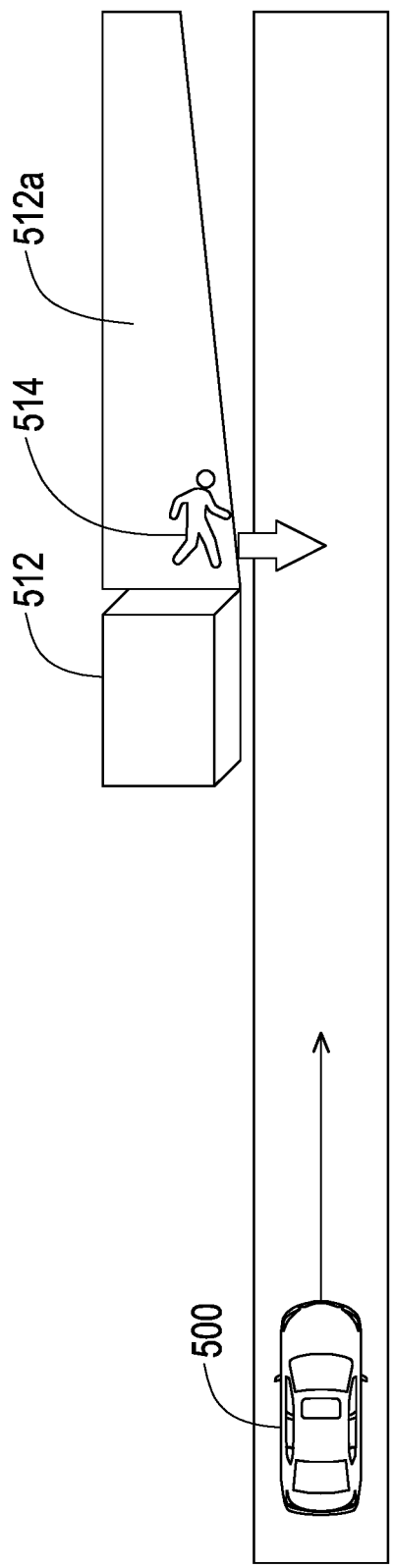

FIGS. 5A and 5B are schematic views illustrating an intersection occlusion scenes according to an embodiment of the disclosure. Referring to FIG. 5A, an image 510 is an intersection image shot by an imaging device disposed on an own vehicle 500. Since there are occlusion objects such as a building 512 on the left side of the intersection, there may possibly be a region where people and vehicles may hide behind the building 512. As shown FIG. 5B, a pedestrian 514 intending to walk across the road may hide at a shadow part 512a behind the building 512, and the shadow part 512a may be considered as an image occlusion of the intersection.

In some embodiments, the imaging device of the own vehicle is able to eliminate the occlusions resulting from low three-dimensional objects (e.g., a three-dimensional object at a height of 50 mm or less) and thin three-dimensional objects (e.g., a three-dimensional object with a width of 30 mm or less) and identify the occlusions resulting from other three-dimensional objects.

Although FIGS. 4A and 4B and FIGS. 5A and 5B illustrate the imaging occlusions ahead of the own vehicle as examples, the disclosure is not limited thereto. In other embodiments, the own vehicle (e.g., at the time of reversing) may also detect imaging occlusions behind the vehicle.

Back to the flowchart of FIG. 2, in Step S204, if the imaging occlusion occurrence detection device 110 does not detect the occurrence of an occlusion, in Step S206, the correction device 120 turns off the radar excessive detection removal process, and, in Step S214, directly outputs the radar target.

Comparatively, in Step S204, if the imaging occlusion occurrence detection device 110 detects the occurrence of an occlusion, in Step S208, the correction device 120 further determines whether an imaging target is present in the occlusion region.

If it is determined that the imaging target is present in the occlusion region, in Step S208, the correction device 120 corrects the radar target by using the imaging target, and, in Step S214, outputs the radar target. In some embodiments, when the imaging occlusion occurrence detection device 110 detects the occurrence of the occlusion and that there is an object bigger than the object where the occlusion occurs at a position further away from the position of the object where the occlusion occurs, the correction device 120 determines that the imaging target is present in the occlusion region, and does not remove the excessive detection of the radar device 104 but corrects the radar target by using the imaging target.

If it is determined that the imaging target is present in the occlusion region, in Step S212, the correction device 120 performs the radar excessive detection removal process according to map information and a velocity vector of the radar target, and, in Step S214, outputs the radar target. In some embodiments, when the imaging occlusion occurrence detection device 110 detects the occurrence of the occlusion, for a laser detection object different from the object where the occlusion occurs, the correction device 120 may determine the position information of a laser detection object based on information such as the driving lane information, the movement direction of the object, the movement velocity of the object, etc., obtained from the map information.

FIGS. 6A to 6D are schematic views illustrating that a determination on implementing in an excessive detection process according to an embodiment of the disclosure.

Referring to FIG. 6A, when a stopped vehicle 610 appears on the rear lateral side of an own vehicle 600, an occlusion region A3 is present because the radar waves propagated by the radar device toward the stopped vehicle 610 are blocked by the stopped vehicle 610. At this time, the path of the radar waves propagated from the radar device toward the stopped vehicle 610 is altered due to the reflection by the stopped vehicle 610. Accordingly, a real vehicle 620 located in the reflection direction is detected, and the real vehicle 620 is considered as an excessive detection vehicle 630 in the original propagation direction of the radar waves. At this time, based on the image information shot by the imaging device, it may be determined that the occlusion region A3 is a region that cannot be sensed by the radar device. Therefore, the excessive detection removal process is performed, and the excessive detection vehicle 630 is removed.

Figure 6B:
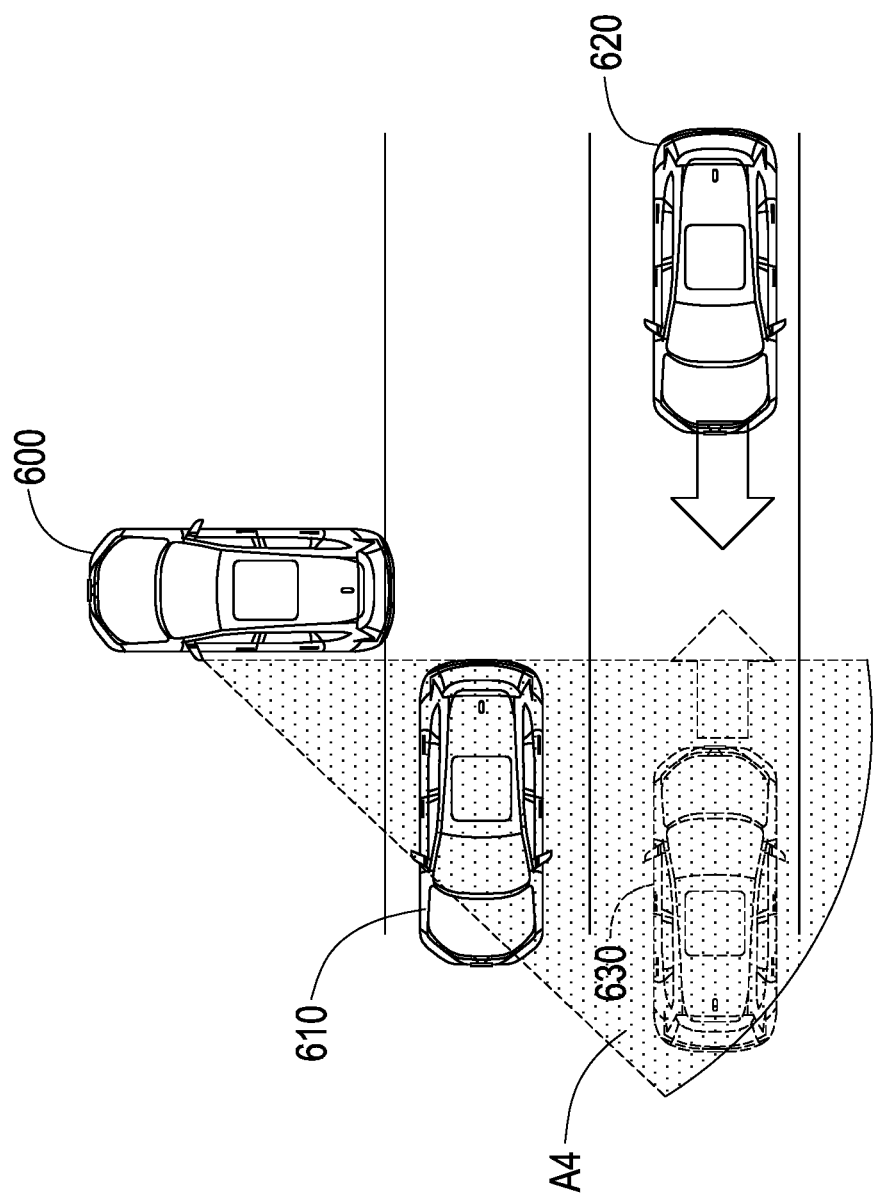

Referring to FIG. 6B, when the stopped vehicle 610 appears on the rear lateral side of the own vehicle 600, if the radar device is not blocked, or the radar device is blocked, which leads to radar excessive detection, but the detection region A4 of the camera is not blocked, so the excessive detection region of the radar can be detected, and, at this time, the identification result of the radar device may be corrected by using the identification result of the imaging device, and the excessive detection may be removed.

Figure 6C:
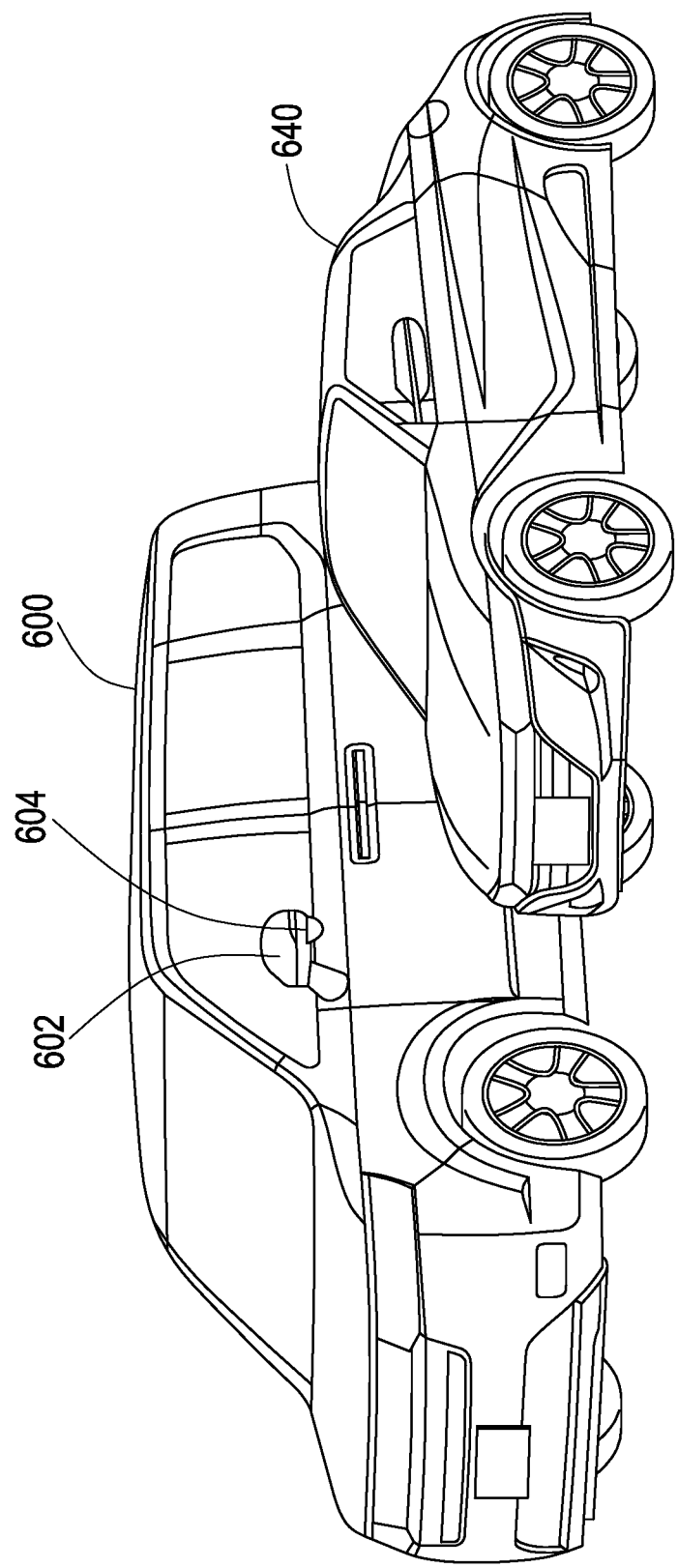

For example, in the scenario shown in FIG. 6C, although a stopped vehicle 640 blocks the detection region of the radar device and causes radar excessive detection, an imaging device 604 disposed on a driving mirror 602 of the own vehicle 600 is not blocked because the imaging device 604 is higher than the stopped vehicle 640. Therefore, the excessive detection region of the radar device can be detected, and the identification result of the radar device is corrected by using the identification result of its own with respect to the excessive detection region, and excessive detection is thus removed.

Figure 6D:
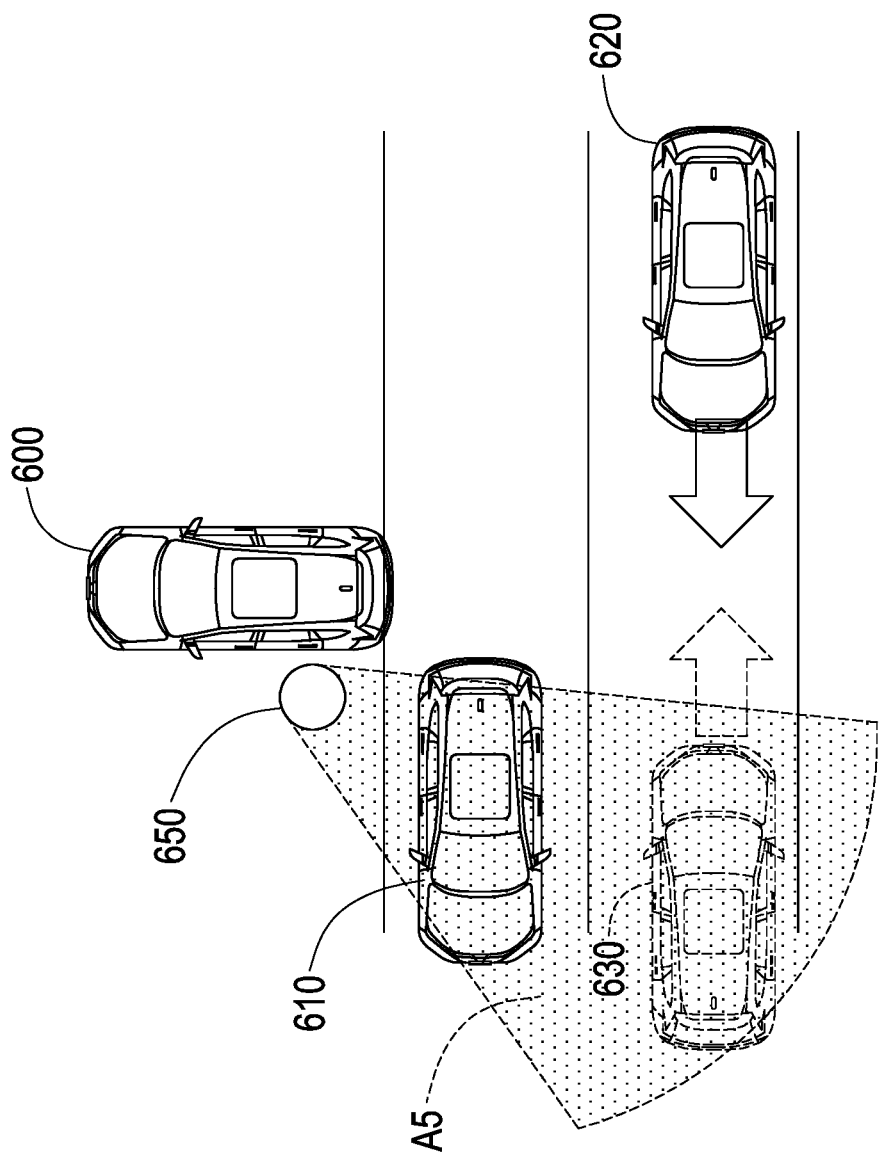

Referring to FIG. 6D, when the stopped vehicle 610 appears on the rear lateral side of the own vehicle 600 and blocks the radar device, if an obstacle (e.g., tree, trash can, etc.) is also present on the lateral side of the own vehicle 600 to block a detection region A5 of the imaging device, the excessive detection removal process is not performed since whether a target that results in radar excessive detection is present cannot be detected.

In view of the foregoing, in the vehicle external detection device according to the embodiments of the disclosure, the imaging target occlusion is detected by analyzing the image information detected by the imaging device. In addition, when the occurrence of the imaging target occlusion is detected, the radar target is corrected. The vehicle external detection device according to the embodiments of the disclosure further includes determining whether to correct the radar target by using the imaging target according to whether the imaging target is present in the occlusion region of the imaging target, or performing the radar excessive detection process according to the map information and the movement velocity of the radar target. Accordingly, the excessive detection target due to multiple paths that pass through the obstacle can be avoided.

Lastly, it should be noted that the embodiments merely serve to illustrate the technical solution of the disclosure, instead of serving to limit the disclosure. Although the disclosure is described in detail with reference to the respective embodiments, people of ordinary skills in the art of this field should understand that they may still modify the technical solutions in the foregoing embodiments, or to equivalently replace some or all of the technical features. Such modifications or replacements will not cause the essence of the corresponding technical solution to deviate from the scope of the technical solutions of the respective embodiments of the disclosure.

What is claimed is:

1. A vehicle external detection device, wherein an imaging device and a radar device are mounted in a vehicle and configured to detect a rear lateral side of the vehicle, detection regions of the imaging device and the radar device being overlapped with each other, and the vehicle external detection device comprising:
   an imaging occlusion occurrence detection device, detecting, from image information detected by the imaging device, an object and an occurrence of an occlusion where the object shields a distant viewing angle; and
   a correction device, correcting position information of an object detected by the radar device when the occurrence of the occlusion is detected, wherein the correction device determines the object detected in the occlusion of the distant viewing angle by the radar device as an excessive detection object, and removes position information of the excessive detection object.

2. The vehicle external detection device as claimed in claim 1, wherein when the occurrence of the occlusion and that an object larger than the object where the occlusion occurs is present at a position further away from a position of the object where the occlusion occurs are detected, the correction device does not remove the position information of the excessive detection object.

3. The vehicle external detection device as claimed in claim 1, wherein when the occurrence of the occlusion is detected, for a laser detection object different from the object where the occlusion occurs, the correction device determines position information of the laser detection object based on driving lane information and object movement velocity obtained from map information.

* * * * *